United States Patent
Feugier

[11] Patent Number: 6,136,285
[45] Date of Patent: Oct. 24, 2000

[54] METHOD AND APPARATUS FOR DIRECT CONVERSION OF URANIUM HEXAFLUORIDE INTO URANIUM OXIDE

[75] Inventor: Andrë Feugier, Chatuzange le Goubet, France

[73] Assignee: Franco Belge de Fabrication de Combustibles, Cedex, France

[21] Appl. No.: 09/153,243

[22] Filed: Sep. 15, 1998

[30] Foreign Application Priority Data

Nov. 28, 1997 [FR] France ............................. 97 15016

[51] Int. Cl.$^7$ ............................................ C01G 43/06
[52] U.S. Cl. ................ 423/260; 423/258; 423/261; 422/141; 422/142; 422/145
[58] Field of Search .............................. 423/258, 260, 423/261; 422/141, 142, 145

[56] References Cited

U.S. PATENT DOCUMENTS

| | | | |
|---|---|---|---|
| 2,333,948 | 11/1943 | Muskat. | |
| 3,845,193 | 10/1974 | Littlechild et al.. | |
| 3,906,081 | 9/1975 | Welty | 423/261 |
| 3,970,581 | 7/1976 | Jeter et al. | 252/301.1 R |
| 3,978,194 | 8/1976 | Knudsen et al. | 423/261 |
| 4,005,042 | 1/1977 | Dada | 252/301.1 R |
| 4,020,146 | 4/1977 | Knudsen | 423/261 |
| 4,031,029 | 6/1977 | Colter et al. | 252/301.1 R |
| 4,053,559 | 10/1977 | Hart et al. | 423/261 |
| 4,090,976 | 5/1978 | DeHollander et al. | 252/301.1 R |
| 4,698,214 | 10/1987 | Linz et al. | 423/260 |
| 4,830,841 | 5/1989 | Urza | 423/261 |
| 4,963,294 | 10/1990 | Yato et al. | 252/636 |
| 5,723,100 | 3/1998 | Carter et al. | 423/261 |
| 5,752,158 | 5/1998 | Stephenson et al. | 423/261 |
| 5,757,087 | 5/1998 | Carter et al. | 423/253 |

FOREIGN PATENT DOCUMENTS

| | | | |
|---|---|---|---|
| 0 230 087 A2 | 7/1987 | European Pat. Off. | C01G 43/025 |
| 2060242 | 6/1971 | France | C01G 43/00 |
| 2 310 315 | 3/1976 | France | C01G 43/02 |
| 2557557 | 7/1985 | France | C01G 43/025 |
| WO 94/26405 | 11/1994 | WIPO | B01J 12/02 |

*Primary Examiner*—Tom Dunn
*Assistant Examiner*—Cam N. Nguyen
*Attorney, Agent, or Firm*—Pollock, Vande, Sande & Amernick

[57] ABSTRACT

The conversion apparatus comprises in succession: a reactor provided with injectors of $UF_6$, steam, and nitrogen so as to cause $UO_2F_2$ to be formed by hydrolysis; a rotary tubular pyrohydrolysis furnace for transforming $UO_2F_2$ into uranium oxide, and provided with heaters distributed in at least five zones; and a tail end for conditioning the oxide powder. The injectors comprise three concentric nozzles connected respectively to inlets for $UF_6$, nitrogen, and steam, $UF_6$ being fed to the central nozzle and nitrogen being injected between $UF_6$ and steam.

11 Claims, 8 Drawing Sheets

METHOD AND APPARATUS FOR DIRECT CONVERSION OF URANIUM HEXAFLUORIDE INTO URANIUM OXIDE

BACKGROUND OF THE INVENTION

The invention relates to methods and apparatuses for direct conversion of uranium hexafluoride ($UF_6$) into uranium oxide (UxOy).

Dry direct conversion of UF6 into uranium oxide has been in industrial use for a long time. Apparatuses for implementing it generally comprise the following components, in succession:

- a reactor provided with injection means for injecting UF6 and steam so as to cause $UO_2F_2$ to be formed by hydrolysis;
- a rotary tubular pyrohydrolysis oven for transforming UO2F2 into uranium oxide, the furnace being provided with heater means and with injection means for injecting a counterflow of steam and hydrogen; and
- means for conditioning the oxide powder.

The methods used until now have been based on the assumption that the reactions implemented are simple, and of the form:

$UF_6+2H_2O \rightarrow UO_2F_2+4HF$ in the reactor $UO_2F2+H_2O \rightarrow UO_3+2HF$ and $UO_3+H_2 \rightarrow UO_2+H_2O$ in the furnace.

Given the simplicity of those reactions, it was believed that individual temperature control in three successive zones of the rotary tubular furnace would suffice.

However, careful analysis of the reactions involved show that they are more complicated; some of them are endothermal while others are exothermal; their reaction kinetics are different.

In the oven or furnace there is initially a pyrohydrolysis reaction which is the sum of two reactions where the first is highly endothermal while the second is slightly exothermal:

$UO_2F2+H_2O \rightarrow UO_3+2HF$ $3UO_3 \rightarrow U_3O_9+\frac{1}{2}O_2$

Those two reactions are not strictly separated. As UO3 forms, it tends to pass to the $U_3O_8$ state with different kinetics. Overall the pair of reactions is highly endothermal.

The subsequent reaction whereby $U_3O_8$ is reduced to UO2 by means of hydrogen also includes intermediate reactions that can be outlined by the following transformations:

$UO_2 \rightarrow U_3O_8-x$ $U_3O_8-x \rightarrow U_4O_9$ $U_4O_9 \rightarrow UO_2$ Each reaction has its own activation energy and its own enthalpy.

Those reactions take place in a counterflow of gas which is injected into the downstream end of the furnace and which initially forms a mixture of hydrogen and of steam which is generally admitted at a temperature of about 350° C. As it flows (in a counterflow relative to powder), the mixture becomes charged with hydrofluoric acid produced by the reaction.

The tubular furnace must be provided with heater means. In the downstream portion of the furnace (in the powder flow direction), the heater means must raise the temperature of the gas to a value that is sufficient to cause reduction to $UO_2$. At the inlet to the furnace, it is necessary to feed the powder and the gases at the pyrohydrolysis temperature.

SUMMARY OF THE INVENTION

The inventors have found that if heating control is restricted to three or even four successive zones of the furnace, then the existence of an initial endothermal reaction gives rise to a temperature profile that is harmful to the quality of the resulting powder. This is because immediately the trigger temperature of the pyrohydrolysis reaction is reached, the highly endothermal nature of this reaction involving all of the $UO_2F_2$ powder gives rise, immediately downstream thereof, to a sudden drop of temperature in the furnace which can temporarily stop the reaction. In other words, there are, in succession along the furnace, a first maximum temperature where pyrohydrolysis is triggered, then a temperature drop, then a new rise caused by continued heating, up to a maximum temperature once fluorine has been eliminated.

An object of the present invention is to provide a method making it possible to obtain a temperature profile that is regular and thus a reaction that takes place progressively and without discontinuity, so as to end up with a product having a quality that is constant and well defined.

To this end, there is provided a method of directly converting uranium hexafluoride into uranium oxide, in which uranium hexafluoride $UF_6$ and steam are injected into a reactor and the resulting $UO_2F_2$ powder is passed into and along a tubular furnace provided with heater means, as a counterflow to a feed of steam and hydrogen. The quantity of heat delivered to at least five successive zones of the furnace is controlled independently so as to bring the temperature of the gases in the inlet zone in the powder flow direction to a value lying in the range 570° C. to 700° C., so as to cause the temperature to rise up to a maximum value lying in the range 730° C. to 800° C. which is reached in the third zone or beyond, and so as to cause the temperature to decrease progressively to the last zone into which hydrogen and steam are fed and heated to a temperature which is sufficient to reduce higher oxides into $UO_2$.

The only purpose of the heating in the last zone is to bring hydrogen and steam in this zone to a temperature that is high enough to finish off the reduction to the state of $UO_2$.

The invention also provides apparatus for direct conversion of uranium hexafluoride into uranium oxide, said apparatus comprising in succession:

- a reactor provided with injection means for injecting $UF_6$ and steam, so as to cause UO2F2 to be formed by hydrolysis; and
- a rotary tubular pyrohydrolysis furnace for transforming $UO_2F_2$ into uranium oxide, the furnace being provided with heater means and with injection means for injecting a counterflow of steam and hydrogen.

The furnace is constituted by at least five successive zones provided with independent heater means, enabling the zones of the furnace to be maintained at different temperatures, temperature measurement means in each zone, either inside the furnace or along its wall, and temperature servo-control means operating by controlling the heater means.

Often, on the basis of prior measurements, a correspondence model will have been established between the temperature as measured inside the furnace in each zone in the gas phase and the temperature as measured against the wall of the furnace, and it is then possible to control the heating resistances in each zone on the basis of temperatures measured along the wall, taking account of the correspondence established by the model and the temperatures to be maintained inside the furnace.

Advantageously, the injector means for injecting the reagents into the reactor comprise a vertical injector having three mutually concentric nozzles respectively connected to inlets for $UF_6$, nitrogen, and steam.

The gaseous products from the reaction, or the excess gases (HF, $H_2O$, $H_2$, $N_2$) are evacuated from the reactor and the furnace through filters that retain the entrained solids, and in particular $UO_2F_2$.

In an advantageous embodiment, the filters are inside the enclosure defining the reactor; then they are maintained at an appropriate temperature, and there is no need for heat insulation and a heating system specific to the filters. That also eliminates leakage to the outside. As a general rule, two filter blocks are provided and used in alternation, so as to enable the filter that is not in use to be unclogged by a back flow of nitrogen, i.e. flowing in the opposite direction to that in which the reaction gases are evacuated.

To maintain a uniform temperature inside the reactor, it is advantageously placed in a lagged case and a flow of air at a regulated temperature is maintained between the wall of the reactor and that of the case. The air may be circulated a blower causing the air to pass through a battery of electric heater resistances, and then around the reactor. The flow can take place around a closed circuit. The filters contained inside the case are thus likewise at a temperature that is well determined and uniform.

In order to ensure that the uranium oxide $UO_2$ supplied by the furnace has uniform characteristics, it is important for the mixture of $UO_2F_2$ powder to be stirred vigorously with the counterflow of hydrogen and steam. For that purpose, the rotary furnace advantageously contains baffles regularly distributed along the furnace, and optionally constituted by twisted fins connecting a central rotary shaft to the cylindrical barrel of the furnace, together with lifting bars disposed inside the cylindrical barrel.

Each zone of the furnace may be defined by a portion of the heat insulation of the furnace within which a plurality of heater resistors are distributed which are insertable and removable by moving transversely to the longitudinal direction of the furnace. For example, the resistors may be located above and beneath the barrel of the furnace. Temperatures can be measured in various zones by means of thermocouples inserted in vertical and/or horizontal passages and terminating close to the barrel to measure the temperature of the wall, or situated on the axis of the furnace.

By way of example, it can be mentioned that a furnace has been made having six successive zones.

The powder leaves the reactor at a temperature that is generally about 330° C. A transition zone between the reactor and the furnace has no heater means. In a first zone, the heater resistances can be regulated to bring the temperature to a value lying in the range 570° C. to 700° C. In practice, an outlet temperature from the first zone lying in the range 650° C. to 690° C. has been found to be satisfactory. In a second zone, constituting a transition towards the maximum, it is necessary to avoid any local drop in temperature that would stop the reaction. The risk of temperature drop is particularly high since nearly all of the powder at the inlet to this second zone is subjected to a reaction that is highly endothermal. In this second zone, a progressive rise in temperature is required up to a temperature that generally lies in the range 700° C. to 800° C. A temperature lying in the range 720° C. to 760° C. has given good results.

Heating is such that a maximum is reached in the third zone or in the fourth.

In the portion situated downstream from the maximum, where only oxide reduction is taking place, heating is such that the temperature decreases regularly toward the steam and hydrogen inlet.

It is preferable to heat strongly from the sixth zone so as to bring hydrogen up to a temperature apt for reducing higher oxides starting from the boundary between the fifth zone and the sixth zone, and to do so at a temperature dropping progressively from the maximum.

These results can be achieved by an appropriate choice of reference temperatures in each zone and by individually controlling each group of resistances allocated to a zone.

An additional advantage of such a furnace is that it makes it easy to adapt the operating parameters to the precise nature of the uranium oxide to be obtained. In some cases, it is not stoichiometric $UO_2$ that is desired, but $UO_2+x$, with x variable up to a value close to $U_3O_8$.

The furnace may also be used without difficulty for other types of processing, for example for reprocessing $UO_2$ powder found to have an excessive residual fluorine content or for reducing $UO_2+x$, or even $U_3O_8$, to the state of stoichiometric $UO_2$.

By using a temperature profile that has a higher maximum, it is possible to obtain $UO_2$ with a low specific area, which is desirable in certain applications, e.g. to make the uranium oxides more stable ($UO_2$ becomes pyrophoric when it has excessive specific area). In this case, the powder product to be reprocessed is injected into the reactor by means other than the injector whose central nozzle at least remains unused.

Seals are provided between the furnace, which constitutes a rotary part, and both the reactor and the unit for conditioning the uranium oxide powder which serves to cool and store the powder. To make it easier to replace the seals, it is advantageous to mount the reactor and the conditioning unit on guide rails carried by a fixed framework, so as to enable them to be moved away from the furnace and give easy access to the seals.

The uranium hexafluoride flow rate (and the steam flow rate) is advantageously modulable over a wide range, e.g. ten to one hundred-fifty kilograms per hour. The operating conditions are such that hydrolysis takes place beyond the end of the injection nozzle, at a temperature lying in the range 150° C. to 500° C.

The above characteristics and others will appear more clearly on reading the following description of a particular embodiment, given by way of non-limiting example. The description refers to the accompanying drawings.

DETAILED DESCRIPTION

The conversion apparatus can be considered as comprising, from upstream to downstream from the UF6 feed to the uranium oxide outlet:

a unit for vaporizing $UF_6$ which is not shown since it may be conventional in structure;

a reactor 12 in which $UF_6$ is hydrolyzed by means of steam, the reactor having means for injecting the reagents in gaseous form and a vessel 14 for collecting $UO_2F_2$, containing an Archimedes' drive screw 18; and a slightly sloping tubular furnace 16 frequently called a kiln in which the $UO_2F_2$ is transformed into uranium oxide.

As shown in the drawings, those components are accompanied by:

a set of safety filters 66 (FIG. 6) in series with internal filters 60 contained in the reactor 12, and placed on the reaction gas evacuation path; and means for recycling uranium oxide powder that is found not to be in compliance with specifications.

These components will now be described in succession.

The reactor 12 (FIGS. 1, 2A, 3, and 4) is contained in a heating case 26, made of thermally insulating material. Inside the case, there are placed heater resistances 28. In the embodiment shown, they are placed in two superposed rows in the bottom portion of the case. The vertical chamber 32 of the reactor is made of a stainless alloy such as Monel or Inconel, and is spaced apart from the case by an air circulation gap. A fan or blower 30 serves to circulate air inside the case around the reactor, causing it to pass over the resistances 28. The power of the heater resistances is regulated so as to maintain the inside of the reactor at an appropriate temperature above 100° C. In practice, the resistances are designed to dissipate power such that the wall is maintained at a temperature lying in the range 150° C. to 350° C.

The chamber 32 in which hydrolysis takes place is fixed to a bottom vessel 14 whose bottom slopes towards an outlet tube 36 leading to the furnace 16. An Archimedes' screw 18 is mounted in the bottom of the vessel to feed the powder into the furnace, and its shaft is driven by an outside electric motor 38 which is independent from the motor for rotating the furnace tube.

The reactor and its heater case are provided with wheels 40 (FIG. 1) enabling them to move a short way along rails 42 belonging to framework on which the various electric drive motors are mounted. The framework is itself mounted on a bedplate via a hinge 44 enabling it to pivot about an axis that extends transversely to the axis of the furnace. In this way the slope of the bottom of the vessel and the slope of the bottom of the furnace can be adjusted, generally to about 2.5%, by means of jacks such as 46.

The means for injecting the reagents into the reactor comprise an injector having three concentric nozzles enabling the jets of $UF_6$ and of steam to be separated by a tubular sheet of nitrogen. The injector shown in FIG. 3 comprises a curved pipe having three concentric tubes each terminated by a respective injector nozzle. These three tubes pass through the wall of the chamber and the heating case and they are provided with respective connections located outside, optionally placed in a common horizontal plane. The inner tube 48 is connected to the vaporizing unit. The middle tube 50 is connected via a connection box to a side branch 54 for feeding nitrogen. The outer tube 52 is connected to a steam feed via a side branch 56.

Figure 1:
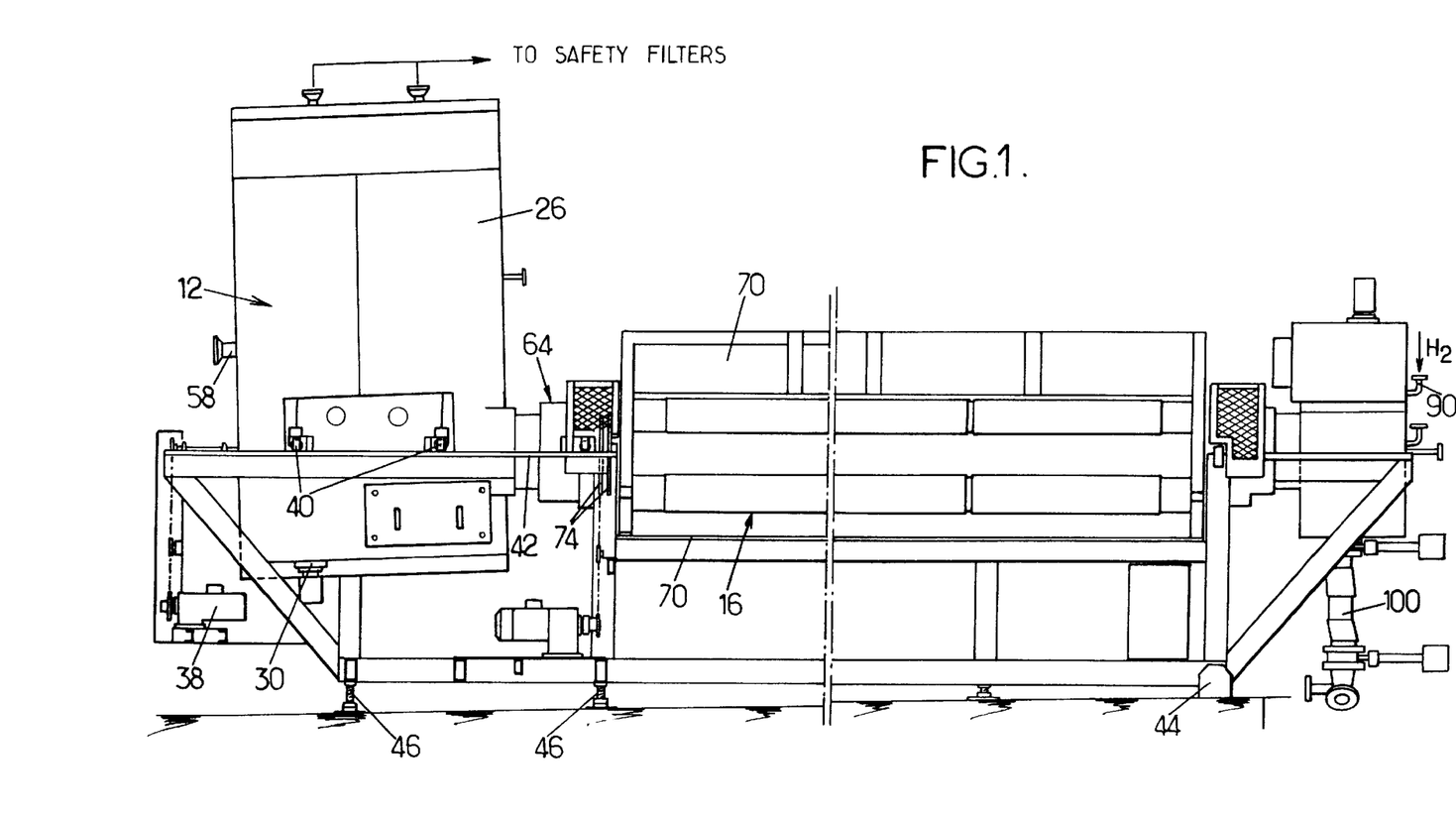
FIG. 1 is an overall side view of apparatus of the by invention, with the exception of the conditioning unit.
Figure 2A:
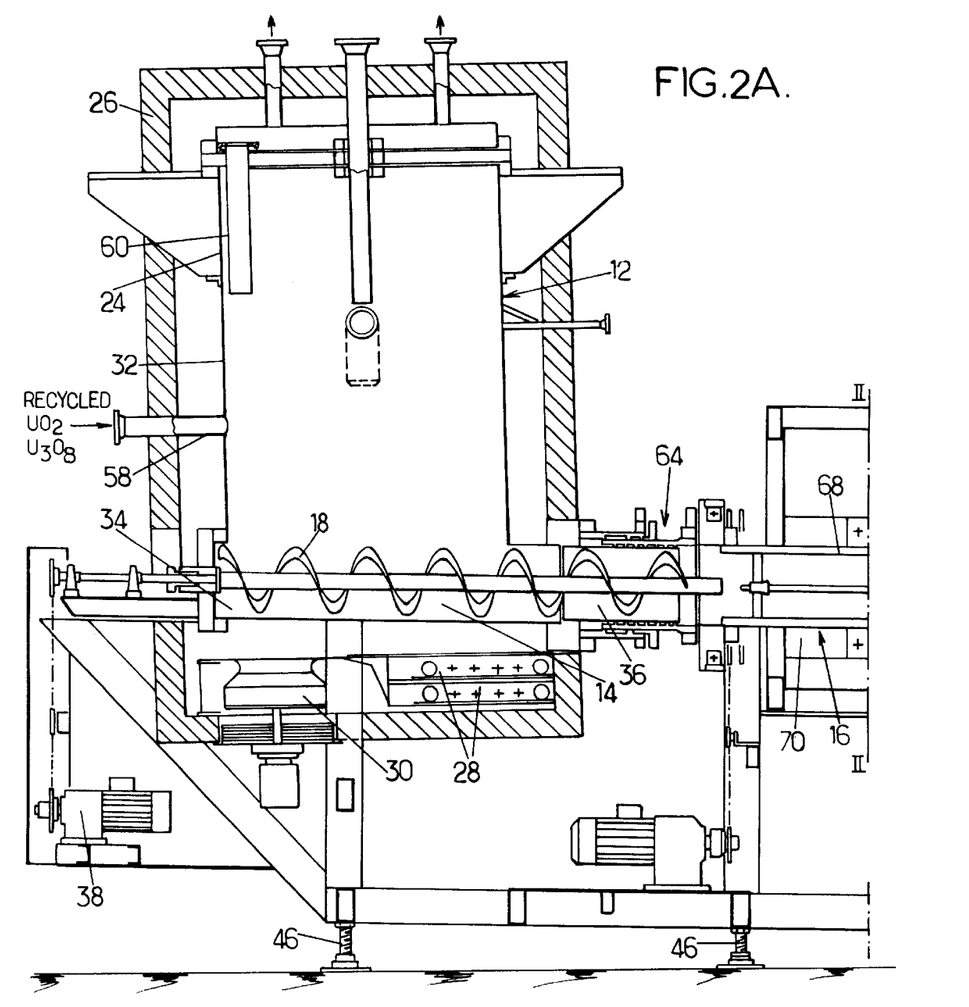
FIGS. 2a and 2b which join on line II—II show the two successive portions of the apparatus in section on a vertical midplane.

A radial nozzle 58 opening out into the reactor can be provided if it is desired to use the apparatus for recycling uranium oxide (FIGS. 1 and 2a). Because injection takes place vertically downwards in the center of the reactor, with the $UF_6$ initially being separated from the steam, a plume is produced that gives rise to $UO_2F_2$ in the form of fine particles at a distance from the nozzles. This downwardly-directed plume is caused to circulate within the reactor enclosure by the counterflow of gas coming from the furnace. The fine particles fall by gravity onto the bottom from which they are conveyed by the Archimedes' screw 18 into the furnace.

The top of the reactor chamber contains filters for retaining uranium oxyfluoride. These filters 60 (only one of which is shown in FIG. 2a) are preferably made of sintered metal. They are contained completely within the reactor, thereby providing several advantages. The filters are maintained at the appropriate temperature without any need for a specific heater system. The risks of leakage to the outside of the installation are small, with sealing of the system being provided by, seals that are easily put into place, and themselves disposed inside an enclosure. Thus, a filter rupturing will not contaminate the premises containing the apparatus with hydrofluoric acid or with a uranium product.

A flow of gas such as nitrogen and excess gaseous reagents that may entrain particles of $UO_2F_2$ or of uranium oxide passes through the filters 60. The particles are retained by the filters and they clog up progressively. Consequently, the filters 60 are unclogged in alternation.

Figure 6:
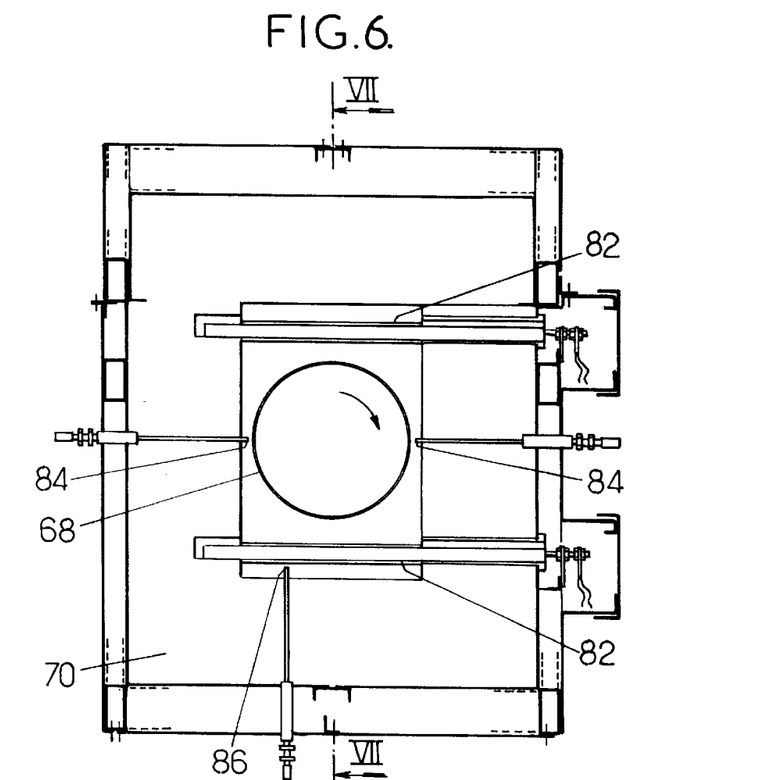
FIG. 6 is a horizontal section view through a fraction of the furnace, showing one possible disposition for the heater pipes.

FIG. 6 is a diagram showing an arrangement enabling unclogging to be performed. The pipe linking each filter block with the outside is provided with a three-way valve 62 making it possible, at will, to direct the gases that have passed through the filter either to a processing installation for condensing hydrofluoric acid and washing the incondensable fraction, or else to inject into the filter hot nitrogen under pressure which returns to the reactor.

To further increase safety in the event of failure of a filter 60, the valves 62 are not directly connected to a processing installation. Safety filters 66, likewise made of sintered metal, are disposed in the vicinity of the reactor and are maintained at a temperature that avoids condensation of aggressive fluids and that ensures confinement of uranium containing material in the event of the internal filters rupturing. These filters do not need to be provided with unclogging means since, in normal operation, they do not receive any powder. They serve firstly to avoid accidental pollution of the installation for processing the gases. They also make it possible to detect incidents by comparing pressures measured at P1 in the chamber, at P2 in the pipe connecting the filters 60 to the safety filters 66, and at P3 downstream from the safety filters 66.

Too great a pressure difference between P2 and P3 means that the safety filters 66 have become clogged with $UO_2F_2$ following a rupture or failure of one or more internal filters 60. Such a fault can be indicated by measurement means connected to probes at P1, P2, and P3.

The presence of safety filters prevents any particle containing uranium reaching the processing installation, which is generally not of a geometrical shape suitable for accepting the presence of enriched uranium in acid solution without risk of criticality.

The furnace 16 (FIGS. 2a and 2b) is connected via a sealing box 64 to the reactor 12.

Figure 2B:
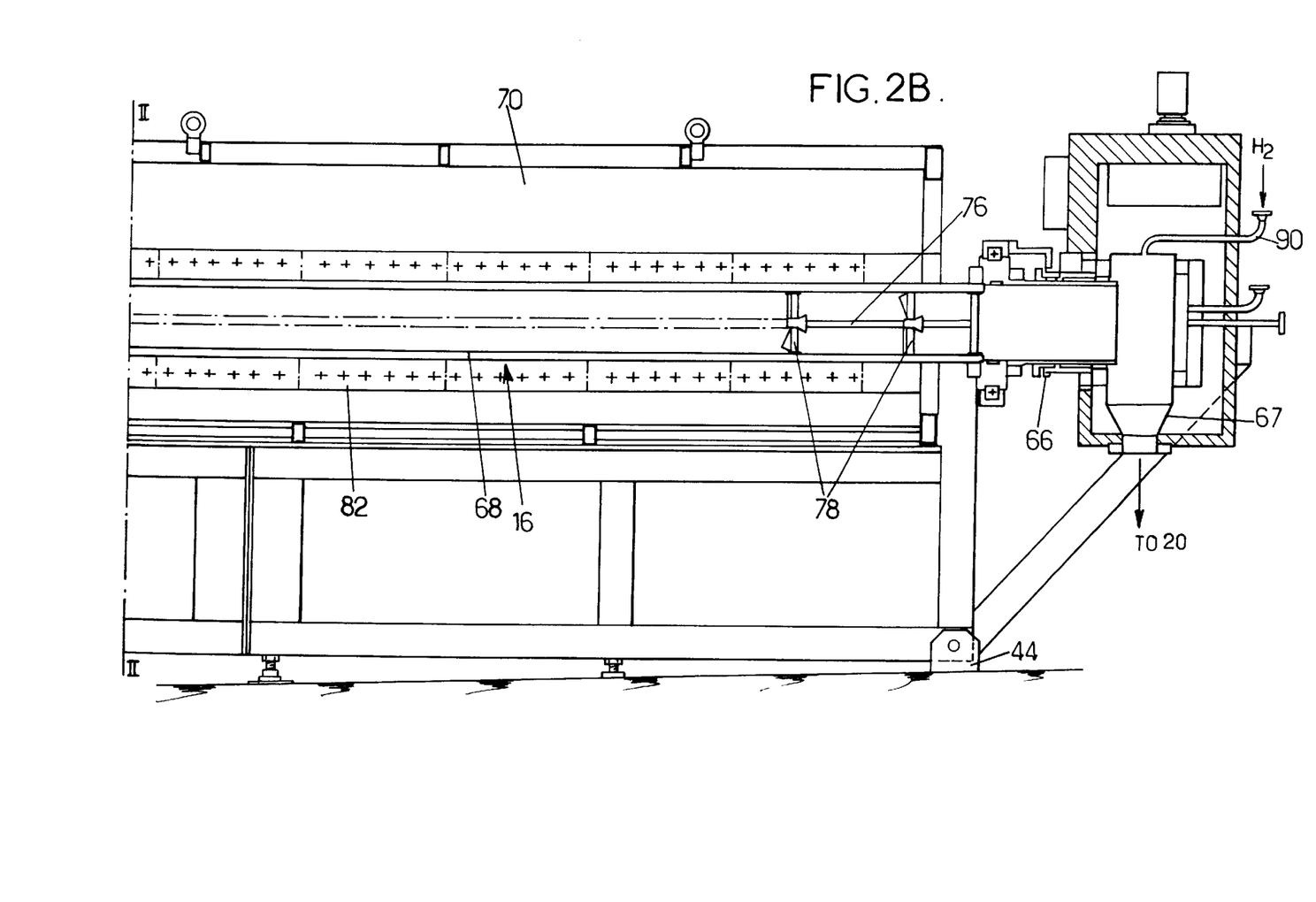
Figure 3:
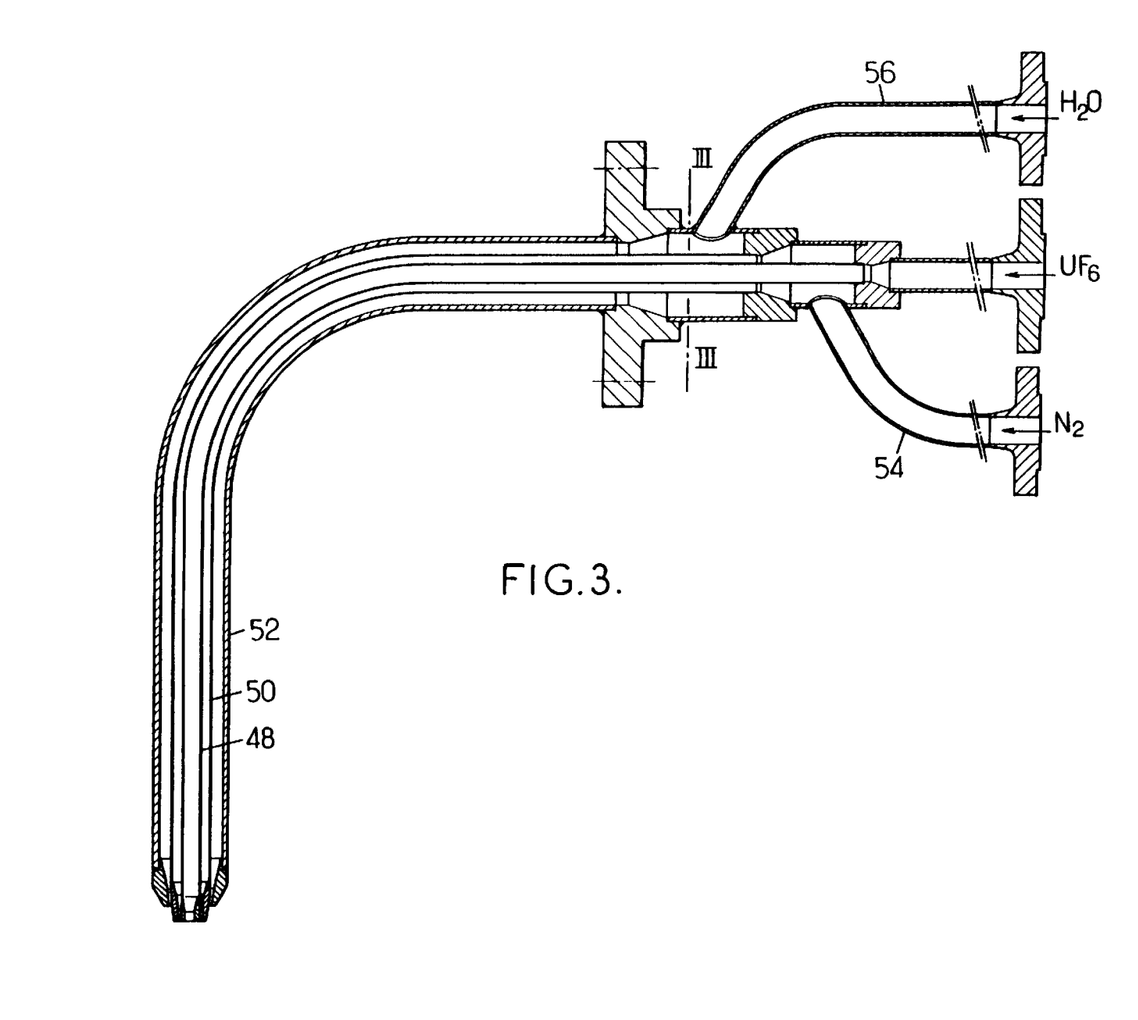
FIG. 3 shows the injector fitted to the reactor of the FIG. 1 device, the left-hand portion from line III being in section on a vertical plane, and the right-hand portion from line III being a section in a horizontal plane.
Figure 4:
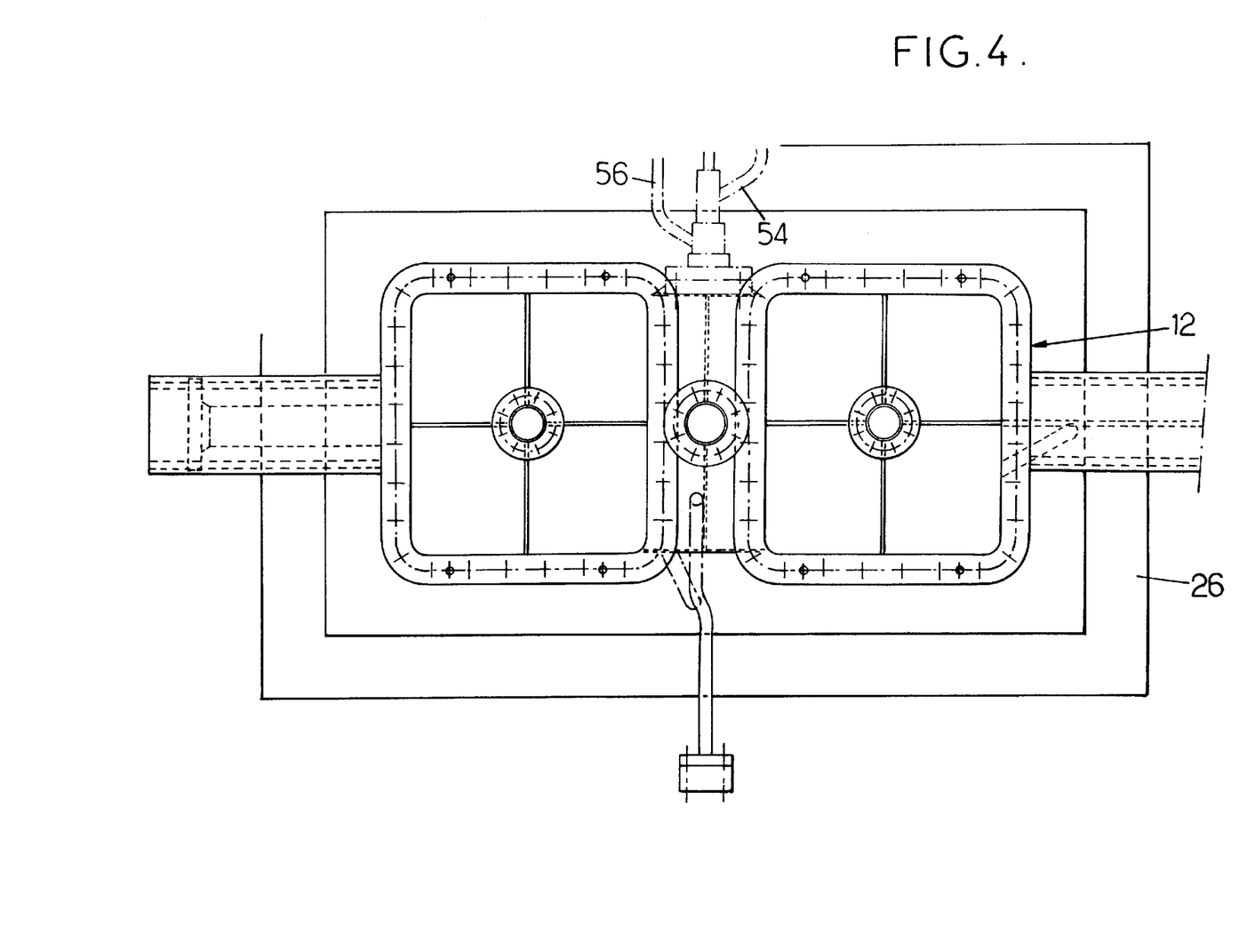
FIG. 4 is a plan view showing the disposition of two filter blocks inside the reactor.
Figure 5:
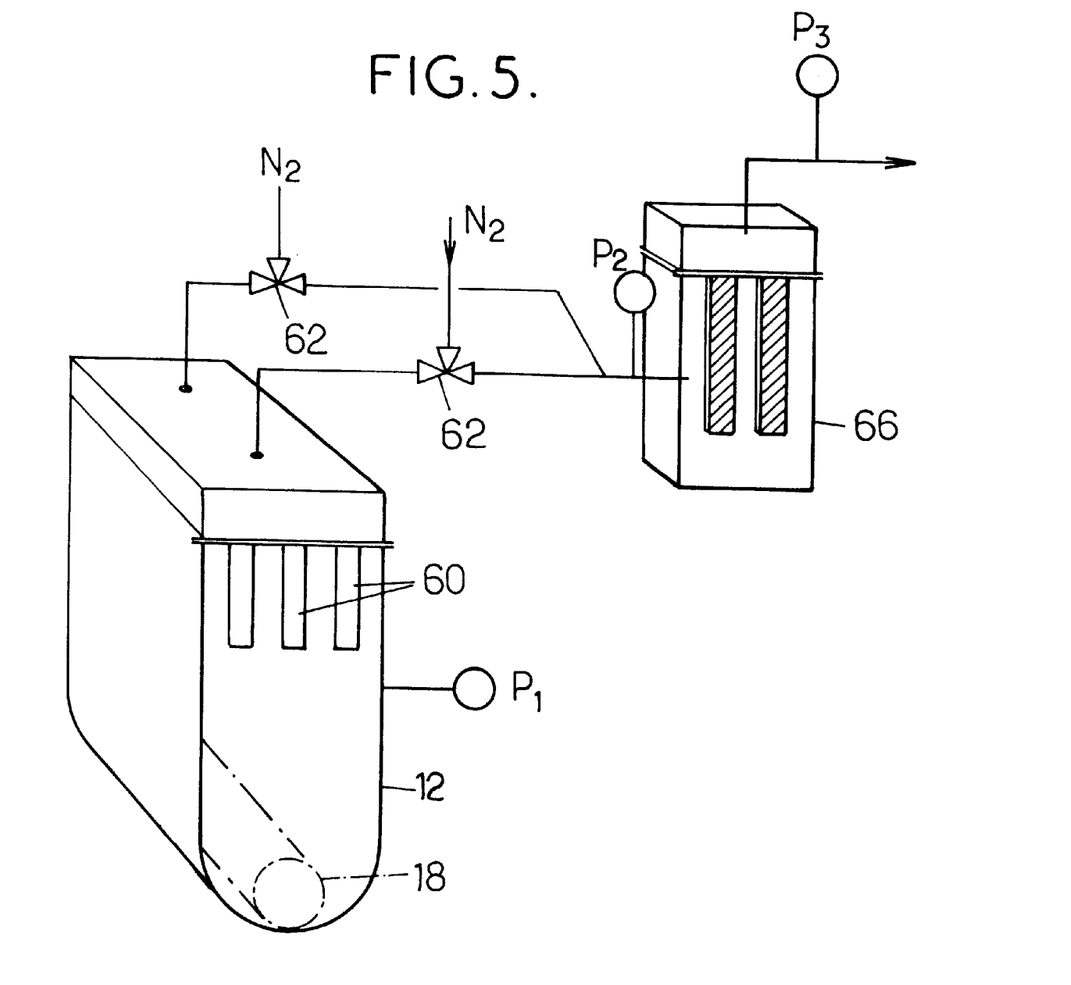
FIG. 5 is a theoretical diagram in perspective showing the connections between the internal filter blocks and the safety filters.

The furnace comprises a rotary drum or barrel 68 contained in a lagged assembly 70. The rotary barrel is fixed to end sleeves which rotate in bearings. One of the sleeves is secured to pulleys 74 driven by one or two electric motors via belts. Baffles are distributed along the furnace. In the embodiment shown they are constituted by fins 78 connecting the barrel to a central shaft 76.

The barrel which is made of an alloy that withstands hydrofluoric acid, such as one of those known under the name "Inconel", is surrounded by heat insulation 70 containing heater means 82 and means 84 and 86 for measuring the temperature of the wall. Other temperature measuring means on the axis of each of the successive zones of the furnace could be constituted by a fixed pipe penetrating into the furnace from its downstream end.

The lagging may be continuous, with zones being individualized by the fact that the heating resistances in any one zone are controlled simultaneously and solely as a function of the temperature in that zone as measured against the wall and/or on the axis. It is possible, by establishing a mathematical model during prior testing, to associate temperature on the axis with temperature along the wall. It is also possible to perform prior testing to establish a model that gives the temperature within the powder flowing along the furnace as a function of temperatures measured on the wall or on the axis, and to do so for different powder flow rates.

In the embodiment shown in FIGS. 2A and 2B, six successive zones are provided. Each of them includes independent temperature measuring means and regulation and heating means.

This subdivision into a plurality of mutually independent lengths makes it possible to take account of the observation that the pyrolysis and reduction reactions are complex.

For example, the pyrohydrolysis reaction:

is, in fact, the sum of two reactions:

These reactions are temperature dependent. The reaction of reducing $U_3O_8$ to $UO_2$ also passes via intermediates that can be outlined as follows:

Each reaction has its own activation energy and its own enthalpy. Subdividing the furnace into at least five zones (six in the embodiment shown), makes it possible to match the characteristics of each reaction.

For reasons of ease of manufacture, all of the zones may be of the same length.

Because of this subdivision, the fluorine content can be brought down to a value that does not exceed a few tens of parts per million (ppm) as from the end of the third zone.

The heater means may have the structure shown in FIG. 6 and comprise electrical resistance heater pipes 82 inserted into the gap between the barrel 68 and the lagging via channels provided horizontally through the lagging. In the example shown in FIG. 7, resistances are provided above the barrel, and other resistances are provided below it. The temperature measuring means may comprise a first set 84 of thermocouples brought into the vicinity of the furnace, close to the barrel, via horizontal passages. Additional thermocouples 86 (FIG. 7 or 8) may be provided beneath the furnace, close to the set of heater pipes 82 in order to detect possible overheating. Nevertheless, the above-described disposition is not limiting or necessary in any way.

The furnace is provided with means for preventing matter agglomerating on the inside wall of the barrel. These means may be constituted by hammers that strike against the wall of the barrel to impart a shock that detaches any clustering. In order to ensure that these members do not always strike the same location on a the barrel, they are controlled by means that are not synchronized with the rotation of the barrel and they strike against metal rings sintered on the barrel.

The means for conditioning the oxide powder may have the structure shown diagrammatically in FIG. 1. In which case they comprise an inlet air lock 100 providing separation between the hot zone of the furnace and a cold zone which prevents vapor from passing into cooling vessels that receive the oxide.

Upstream from the transfer air lock towards the conditioning means, the powder outlet apparatus includes a hydrogen inlet 90 for hydrogen that travels along the furnace as a countercurrent; residual hydrogen is evacuated together with the hydrofluoric acid via the filters 60.

Figure 8:
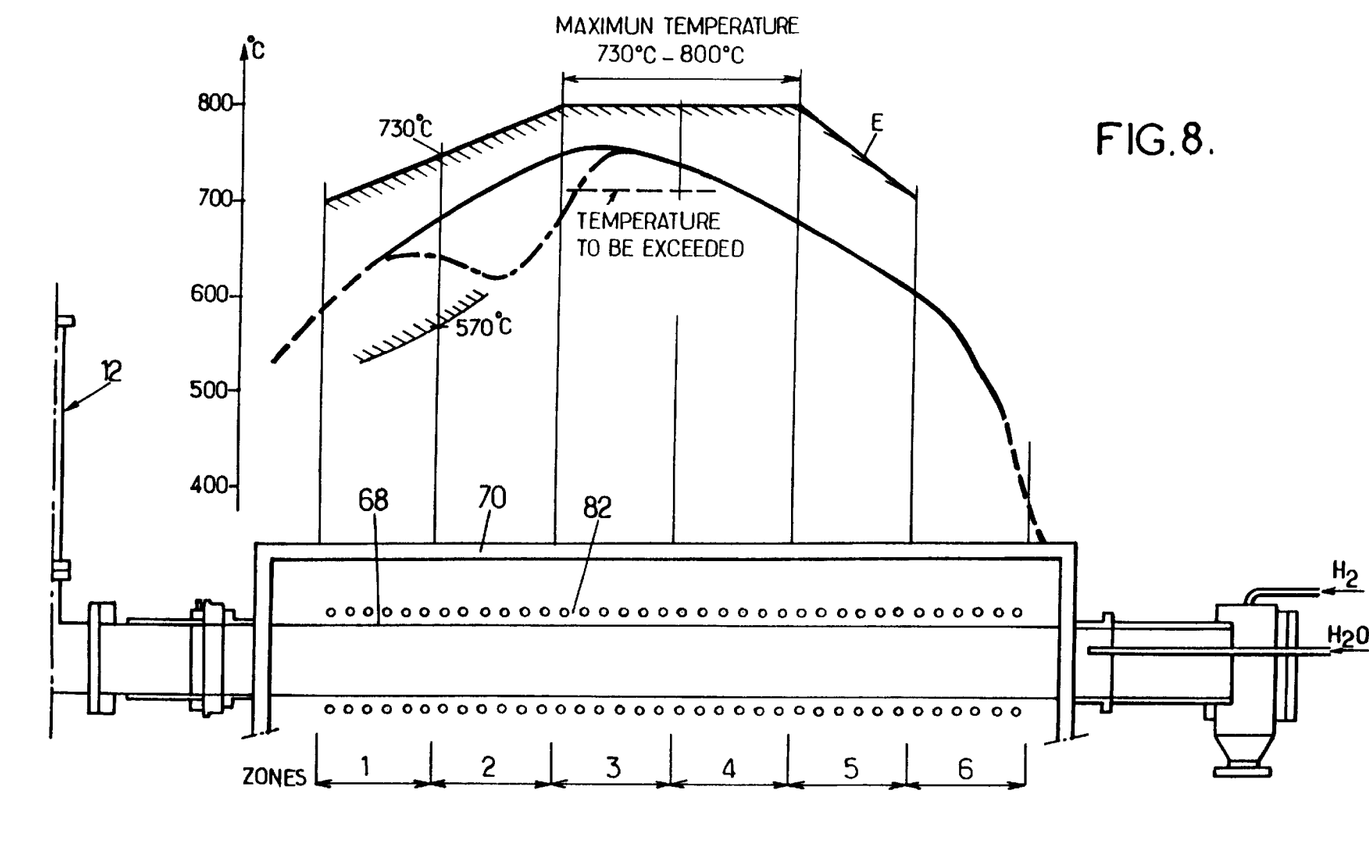
FIG. 8 is a representative profile of gas temperature in the furnace.

The solid line curve in FIG. 8 constitutes an example of how temperature may vary progressively in a manner made possible by the invention. Upstream from the first zone, the hot gases initially increase the temperature of the $UO_2F_2$ that arrives generally at about 500° C. A gas temperature close to 700° C. is reached at the end of the first zone and that temperature thereafter increases regularly up to about 750° C. reaches in the middle of the third zone. Because of the regulation in the second zone, where the amount of heat added can be particularly great, the previously difficult-to-avoid temperature drop as represented by a chain-dotted line is successfully avoided in this case. Beyond the third zone, temperature is maintained at the values required to cause progressive conversion to $UO_2$. In the last zone, the incoming gases ($H_2$ and $H_2O$) are fed in at a gas temperature of about 600° C., thereby enabling reduction to be performed. It can be seen that temperature remains throughout within an envelope E.

Figure 7:
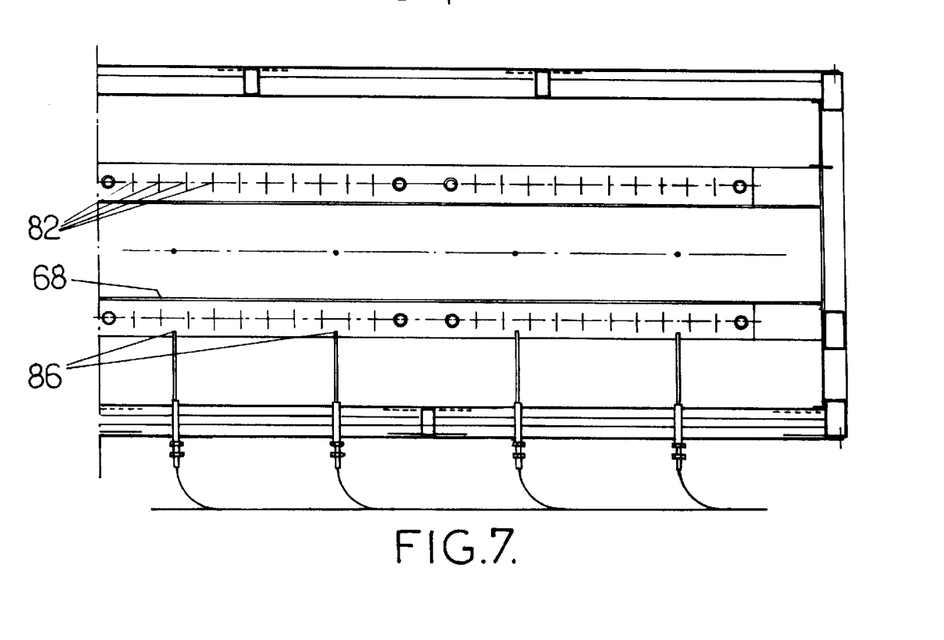
FIG. 7 is a section view on the axis of the furnace (line VII—VII in FIG. 6), showing a possible distribution of the measurement thermocouples.

In general, temperatures are measured in the middle of each zone, as indicated by points in FIG. 7.

What is claimed is:

1. A method of directly converting uranium hexafluoride into uranium oxide, said method comprising the steps of:
   (a) injecting uranium hexafluoride $UF_6$ and steam into a reactor and passing resulting $UO_2F_2$ powder into and along a tubular furnace, in countercurrent to a feed of steam and hydrogen,
   (b) injecting hydrogen into a last one of at least five successive zones of said furnace; and
   (c) delivering controlled amounts of heat to said at least five successive zones of the furnace and controlling said amounts of heat independently in said zones,
       (i) to bring a temperature of gases in a first of said zones to a value in the range 570° C. to 700° C.,
       (ii) to increase the temperature of the gases to a maximum value in a range 730° C. to 800° C. reached in a third of said zones or beyond; and
       (iii) to cause temperature to decrease progressively to a last one of said zones while maintaining the temperature in said last zone at a value sufficiently high to cause reduction of higher uranium oxides into $UO_2$.

2. A method according to claim 1, wherein $UF_6$, nitrogen, and steam are injected concentrically into said reactor with $UF_6$ internally and nitrogen in an annular space between $UF_6$ and steam, and adjusting flow rates of $UF_6$, nitrogen, and steam relative to each other for a $UO_2F_2$ formation reaction to take place beyond the end of a central nozzle for injecting said $UF_6$.

3. A method according to claim 1, wherein said $UF_6$, nitrogen and steam are injected downwardly into a central part of the reactor by downwardly directed concentric nozzles.

4. A method according to claim 1, wherein a temperature profile is maintained in said zones which causes transformation of $UO_2F_2$ into $UO_3$ in a portion of said furnace before an end of a second zone of said at least five zones, starting from the reactor.

5. A method according to claim 1, further comprising the steps of filtering reaction cases within said reactor, before they leave the reactor, for retaining solids, and directing filtered gases to an external gas processing installation.

6. A method according to claim 5, further comprising providing safety filters after said filtering and upstream of said gas processing installation and measuring a pressure differential across the safety filters for detecting damage to the filters providing the first filtering.

7. A method according to claim 1, comprising circulating gas along a path successively over heater resistors and in and along a space between a wall of the reactor and an outer wall.

8. A method according to claim 1, wherein, during step (c), heating in a second one of said zones is controlled for the temperature to increase continuously without a local temperature drop.

9. A method according to claim 1, including stirring $UO_2F_2$ in said tubular furnace.

10. In a method of directly converting uranium hexafluoride into uranium oxide, comprising injecting uranium hexafluoride $UF_6$ and steam into a reactor and passing resulting $UO_2F_2$ powder into and along a tubular furnace, as a counterflow to a feed of steam and hydrogen, (a) a preliminary step of establishing a correspondence model between gas temperatures as measured in each of at least five successive zones inside the furnace in said zones and corresponding temperatures against a wall of the furnace in said zones when heat is delivered by electrical resistors to said at least five successive zones of the furnace, (b) injecting uranium hexafluoride $UF_6$ and steam into the reactor and passing the resulting $UO_2F_2$ powder into and along the tubular furnace, (c) injecting hydrogen into a and last one of said zones, (d) independently controlling amounts of heat delivered by said resistors for bringing the temperatures as measured against the wall to values that cause a predetermined gas temperature profile in the furnace to be obtained, based on said model, said temperature profile including:

a temperature of gases at an end of a first of said zones in the range of 570° C. to 700° C., a gas temperature increase to a maximum value in the range 730° C. to 800° C. reached in a third of said zones or beyond, a progressive decrease of the gas temperature to a last one of said zones into which hydrogen is fed, while heating said last zone at a temperature sufficient to reduce higher uranium oxides into $UO_2$.

11. A method according to claim 10, wherein said $UF_6$, nitrogen and steam are injected via three mutually concentric nozzles, the nitrogen being injected between $UF_6$ and the steam.

* * * * *